US008325156B2

(12) United States Patent
Lai

(10) Patent No.: US 8,325,156 B2
(45) Date of Patent: Dec. 4, 2012

(54) OPTICAL TOUCH SCREEN DEVICE

(75) Inventor: Cheng-Yi Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 353 days.

(21) Appl. No.: 12/629,129

(22) Filed: Dec. 2, 2009

(65) Prior Publication Data
US 2010/0271333 A1 Oct. 28, 2010

(30) Foreign Application Priority Data
Apr. 25, 2009 (CN) .......................... 2009 1 0301846

(51) Int. Cl.
G06F 3/042 (2006.01)

(52) U.S. Cl. ....................................................... 345/175

(58) Field of Classification Search .................. None
See application file for complete search history.

(56) References Cited

U.S. PATENT DOCUMENTS

| | | | |
|---|---|---|---|
| 6,972,753 B1* | 12/2005 | Kimura et al. ................. | 345/175 |
| 7,411,575 B2* | 8/2008 | Hill et al. ....................... | 345/156 |
| 7,432,893 B2* | 10/2008 | Ma et al. .......................... | 345/87 |
| 7,442,914 B2* | 10/2008 | Eliasson et al. ................ | 250/221 |
| 7,460,110 B2* | 12/2008 | Ung et al. ...................... | 345/173 |
| 7,705,835 B2* | 4/2010 | Eikman ......................... | 345/176 |

* cited by examiner

Primary Examiner — K. Wong
(74) Attorney, Agent, or Firm — Altis Law Group, Inc.

(57) ABSTRACT

An optical touch screen device includes a display panel, an infrared light source module, a number of elongated reflective plates, and an infrared image capture module. The display panel includes a display screen. The infrared light source module has a strip-shaped light output portion generally parallel with the display screen. The strip-shaped light output portion is arranged along an edge of the display screen and configured for outputting infrared light to illuminate the display screen. The elongated reflective plates are arranged along the other edges of the display screen. The reflective plates is configured for reflecting the light from the light output portion to the display screen, thereby the light from the light output portion and the reflected light cooperatively forming an infrared light field. The infrared image capture module is configured for capturing an image of the entire display screen.

7 Claims, 3 Drawing Sheets

OPTICAL TOUCH SCREEN DEVICE

BACKGROUND

1. Technical Field

The present disclosure relates to an optical touch screen device.

2. Description of Related Art

A touch panel incorporated into a thin film transistor (TFT) liquid crystal display (LCD) has been proposed. A typical LCD includes a pair of glass substrates which are separated by a layer of liquid crystal material. Commonly, the touch panel can be selected from a resistive touch panel and a capacitive touch panel.

In the above described LCD, the touch panel is usually attached to a display screen of the LCD. However, such arrangement inevitably increases a thickness of the LCD. Furthermore, the brightness of the LCD may reduce.

Therefore, an optical touch screen device which can overcome the above mentioned problems is desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Various embodiments will now be described in detail below with reference to the drawings.

Figure 1:
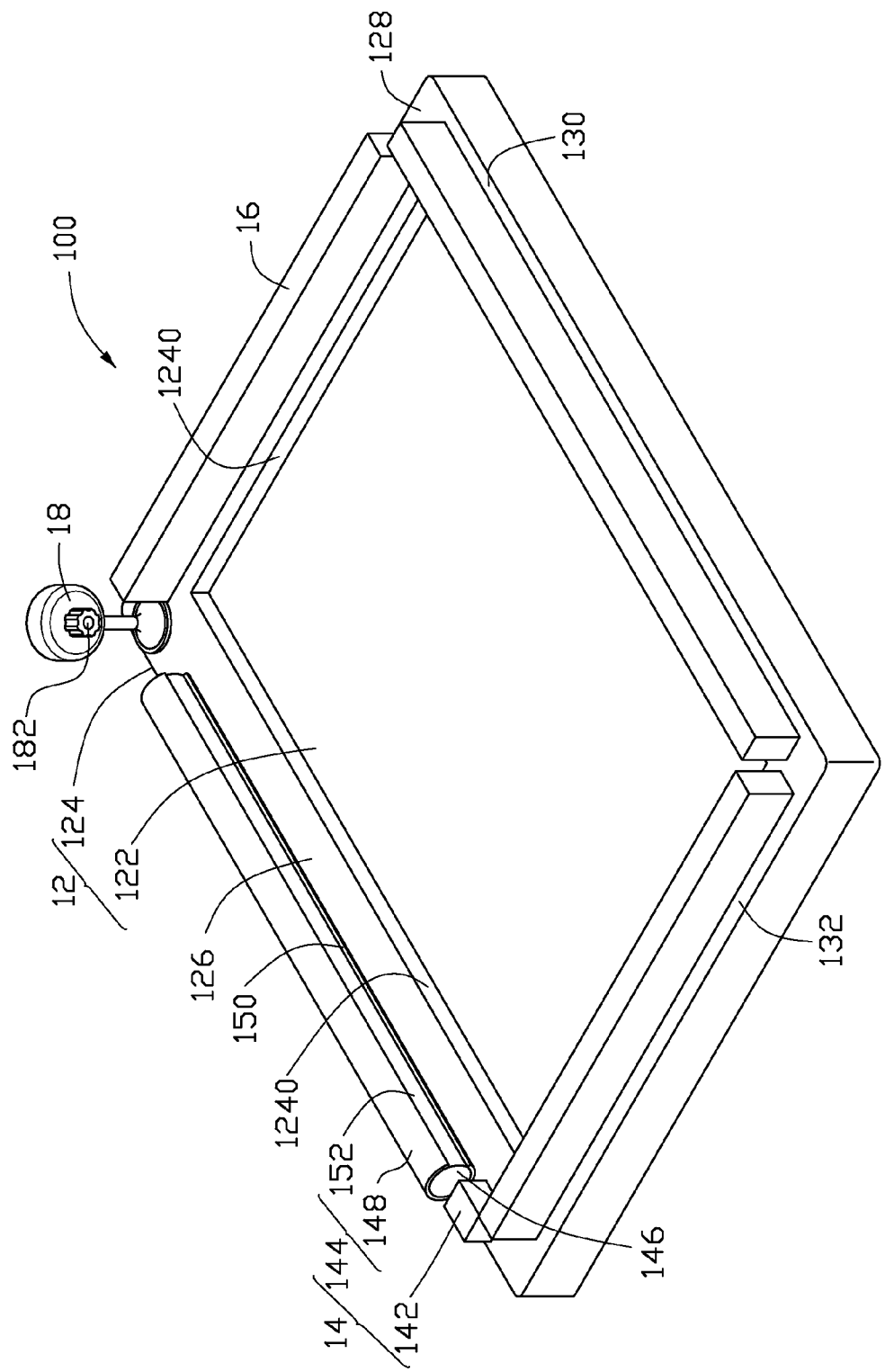
FIG. 1 is a schematic, isometric view of an optical touch screen device in accordance with a first exemplary embodiment.

Referring to FIG. 1, an optical touch screen device 100 in accordance with a first exemplary embodiment includes a display panel 12, a light source module 14, three reflective plates 16 and an image capture module 18.

The display panel 12 can be selected from the group consisting of a liquid crystal display panel, a field emission display panel and a plasma display panel. The display panel 12 includes a rectangular display screen 122 and a securing shell 124 mounted around the display screen 122. The securing shell 124 includes four sides 126, 128, 130 and 132 arranged along four edges of the display screen 122, respectively. The four sides 126, 128, 130 and 132 each have an inner periphery 1240 adjacent to and surrounding the display screen 122. It is needed to explain that, in FIG. 1 the inner periphery 1240 corresponding to the sides 130 and 132 cannot be seen from such viewing angle. The securing shell 124 is configured for protecting the display screen 122 from damage.

The light source module 14 is fixed on the side 126 of the securing shell 124. The light source module 14 includes an infrared point light source 142 and a light guiding member 144. In one embodiment, the infrared point light source 142 is an infrared light emitting diode. The light guiding member 144 has an elongated-column shape extending parallel with the side 126. In this embodiment, the light guiding member 144 is generally cylindrical. Preferably, the light guiding member 144 has a length slightly larger than the inner periphery 1240 of the side 126.

The light guiding member 144 includes a cylindrical light guiding portion 152 and a light reflective layer 148 partly coated on the outer surface of the light guiding portion 152. The light guiding portion 152 includes a light incident surface 146 at one distal end thereof. The light enters into the light guiding portion 152 from the light incident surface 146. The infrared point light source 142 is positioned facing toward the light incident surface 146.

The reflective layer 148 is formed on the side surface and the other distal end of the light guiding portion 152. The reflective layer 148 covers the entire side surface and the entire opposite distal end of the light guiding portion 152 except a light output portion 150. The reflective layer 148 includes an inner surface (not shown) capable of blocking and reflecting light. The light output portion 150 is formed on the side surface of the light guiding portion 152. In this embodiment, the light output portion 150 is a light output slot 150 extending parallel with a principal axis of the light guiding portion 152. The light output portion 150 is arranged facing toward the opposite side 130. The light output portion 150 is preferably longer than the inner periphery 1240 of the side 126, and more preferably the light output portion 150 extends from one distal end of the light guiding portion 152 to the opposite distal end, thereby the light transmitted out of the light output portion 150 can cover the entire display screen 122. The light output portion 150 is configured for guiding the light transmitted out of the light output portion 150 to form a light field (see light field 180 in FIG. 2) generally parallel with and over the display screen 122.

Alternatively, a shape of the light guiding member 144 can also be selected from an elliptic column, a prism and etc. Also, the light guiding portion 152 of the light guiding member 144 can be omitted. In that case, the light reflective layer 148 forms an elongated cavity. The light in the cavity is reflected by the inner surface of the light reflective layer 148 and is transmitted out from the light output portion 150. Certainly, the light guiding member 144 can be replaced by a fiber with a light output portion formed on a side wall thereof. Furthermore, the light output portion 150 can also be filled with light-pervious materials, not limited to the present embodiment.

Figure 2:
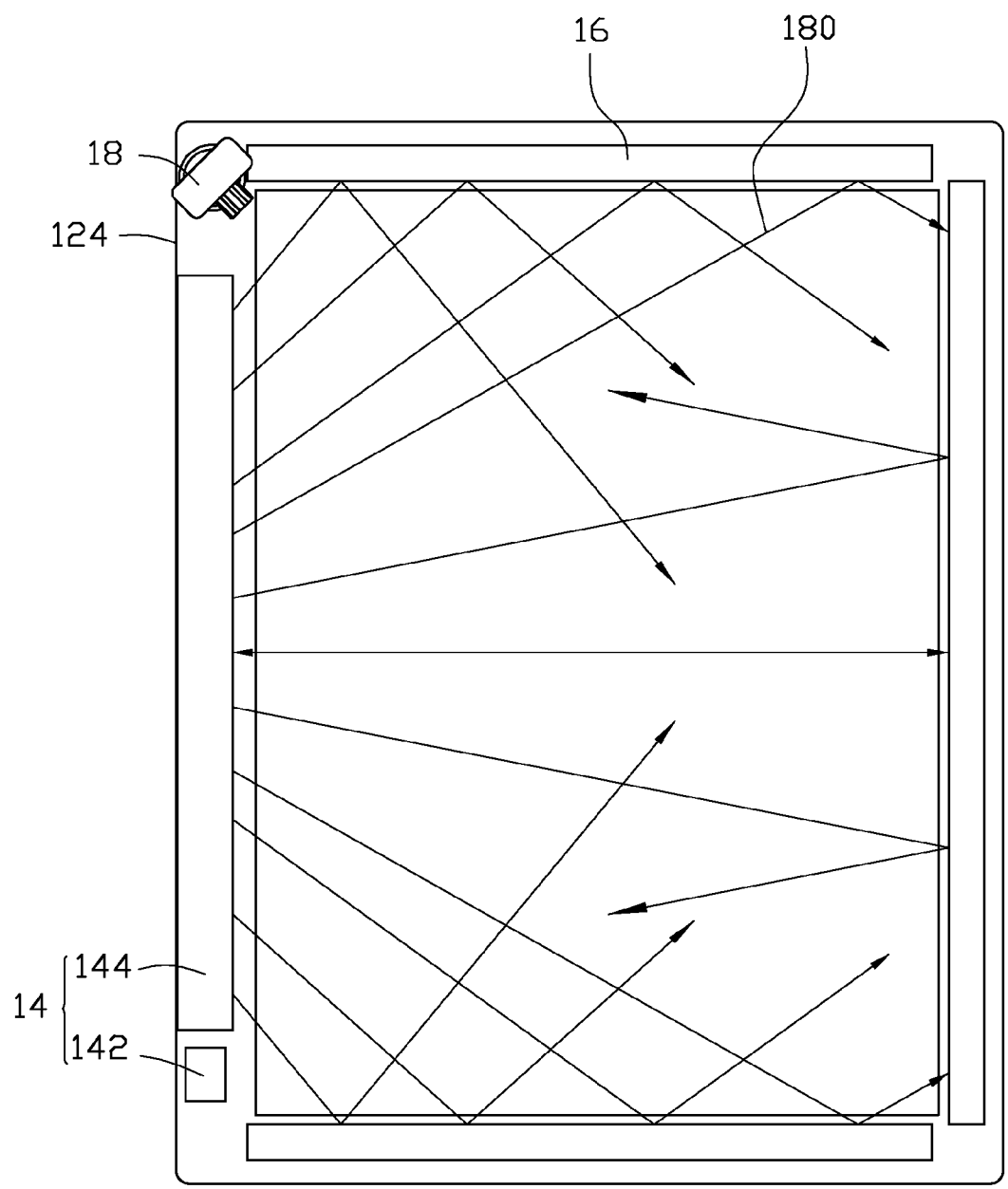
FIG. 2 is a schematic, top view of the optical touch screen device of FIG. 1, showing an imaginary light field formed over a touch screen of the optical touch screen device of FIG. 1.

The three reflective plates 16 are arranged along the three sides 128, 130 and 132. The three reflective plates 16 each extend parallel with the corresponding one of the three sides 128, 130 and 132. Preferably, the three reflective plates 16 each are longer than or equal to the corresponding inner periphery 1240. Referring to FIG. 2, the three reflective plates 16 are configured for reflecting light transmitted out from the light output portion 150 back to a field over the display screen 122. Thereby, a light field 180 is formed over the display screen 122. As shown in FIG. 2, the light field 180 is formed by a number of imaginary light rays emitted from the light output slot 152 and reflected by the three reflective plates 16.

The image capture module 18 is positioned on the securing shell 124. The image capture module 18 is arranged at a corner of the securing shell 124 between the sides 126 and 128. A field of view of the image capture module 18 covers the entire display screen 122. The image capture module 18 includes a lens module 182 for entrance of light. The lens module 182 is positioned over and facing the light field 180, and the light field 180 is formed between the lens module 182 and the display screen 122, thereby preventing the light transmitted out of the light output portion 150 and the light reflected by the three reflective plates 16 from directly entering into the image capture module 18 via the lens module 182.

Referring to FIGS. 1 and 2, a process for realizing a touch control function using the optical touch screen device 100 is described as follows. Firstly, the field of view of the image capture module 18 is adjusted such that the entire display screen 122 is located in the field of view of the image capture module 18. Then a coordinate position of the display screen 122 in the field of view of the image capture module 18 is calculated by a processing unit (not shown), for example coordinate positions of four points at four corners of the display screen 122 in the field of view of the image capture module 18 are calculated. Then coordinate positions of the entire display screen 122 in the view field of the image capture module 18 can be calculated based on the above four coordinate positions.

Secondly, an object, such as a finger, moves toward and then touches the display screen 122. In the moving process, the finger certainly will intercept some light in the light field 180 and thus cause a change in the light field 180. Here the finger reflects light of the light field 180 to the image capture module 18. Then the image capture module 18 analyzes/detects a coordinate position of the finger based on the change in the light field 180. The coordinate position of the finger is compared with the image capture module 18, thereby calculating the coordinate position of finger relative the display screen 122. Finally, an instruction is executed based on the coordinate position of the finger.

It is to be understood that it is not necessary to touch the display screen 122, as long as the finger intercepts the light field 180. The image capture module 18 can also be placed at other positions of the display panel 12, as long as the image capture module 18 has a view of field covering the entire display screen 122.

Figure 3:
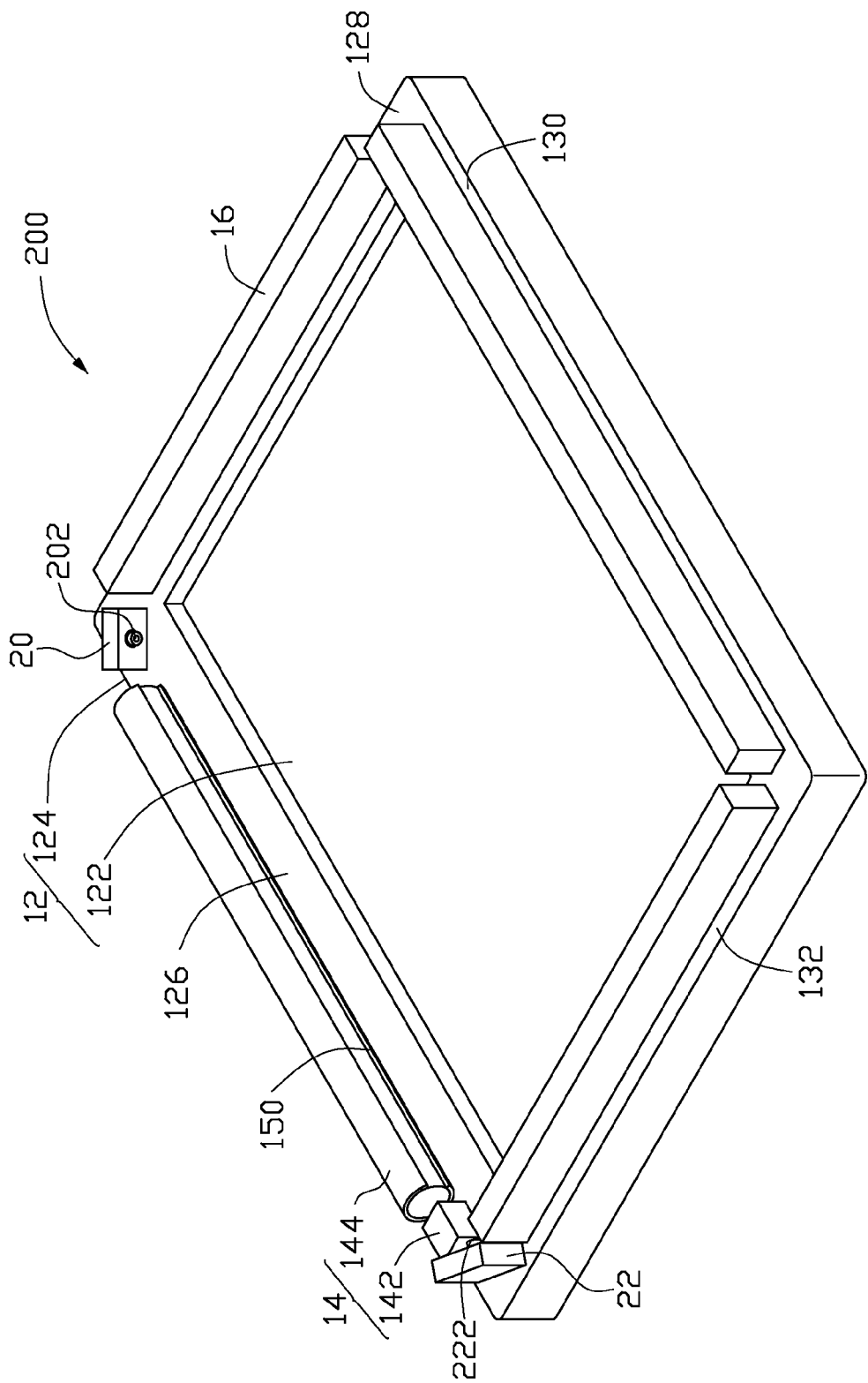
FIG. 3 is a schematic, isometric view of an optical touch screen device in accordance with a second exemplary embodiment.

Referring to FIG. 3, an optical touch screen device 200 in accordance with a second exemplary embodiment is similar to the optical touch screen device 100 of the first exemplary embodiment, except that the optical touch screen device 200 includes two image capture modules 20 and 22. The image capture module 20 and 22 are positioned on the securing shell 124. The image capture module 20 is located at one corner of the securing shell 124 between the sides 126 and 128. The image capture module 22 is located at one corner of the securing shell 124 between the sides 126 and 132. That is, the two image capture modules 20 and 22 are located adjacent two opposite ends of the light source module 14. A lens module 202 of the image capture module 20 and a lens module 222 of the image capture module 22 are arranged in the light field 180 and facing toward the display screen 122 as shown in FIG. 2. In that case, the image capture module 20 and 22 is capable of picking up light reflected by the three reflective plates 16. In this embodiment, the image capture module 20 and 22 each are a linear sensing means.

When an object, such as a finger, moves toward and then touches the display screen 122, the finger intersects the light field 180. Thus some light rays transmitted to the lens modules 202 and 222 are intercepted by the finger, thereby forming a shadow. Then the shadow formed by the finger is captured by the image capture modules 20 and 22. It is simple to calculate the angle of the finger's position with respect to the central axis of the image capture module 20 and the angle of the finger's position with respect to the central axis 22. This angular information from the two image capture modules 20 and 22 defines a unique location of the finger on the display screen 122. Finally, an instruction is executed based on the location of the finger.

The optical touch screen devices 100 and 200 have at least an advantage of having no other layers on the display screen 122, thereby enhancing the brightness thereof. Additionally, the structure and the manufacture process of the optical touch screen devices become simple. In an alternative embodiment, the optical touch screen device can also be used as an electronic hand-written screen.

Finally, it is to be understood that the above-described embodiments are intended to illustrate rather than limit the disclosure. Variations may be made to the embodiments without departing from the spirit of the disclosure. The above-described embodiments illustrate the scope of the disclosure but do not restrict the scope of the disclosure.

The invention claimed is:

1. An optical touch screen device comprising:
a display panel comprising a display screen;
an infrared light source module having a strip-shaped light output portion generally parallel with the display screen, the strip-shaped light output portion being arranged along an edge of the display screen, configured for outputting infrared light to illuminate the display screen;
a plurality of elongated reflective plates arranged along the other edges of the display screen, the reflective plates being configured for reflecting the light from the light output portion to the display screen, thereby the light from the light output portion and the reflected light cooperatively forming an infrared light field; and
an infrared image capture module being a single image capture device and a lens module positioned over and facing the light field, the light field being located between the display screen and the lens module, and the image capture device configured for sensing the light field and changes thereof caused by an object disposed in the light field and analyzing the relative location of the object on the display screen based on the changes of the light field.

2. The optical touch screen device of claim 1, further comprising a securing shell mounted around the periphery of the display screen, the image capture device being positioned on the securing shell.

3. The optical touch screen device of claim 1, wherein the light source module comprises a light emitter and an elongated light guiding member, the light guiding member comprising a light incident surface at a distal end of the light guiding member, the light output portion being at a longitudinal side surface of the light guiding member, the light emitter facing toward the light incident surface.

4. The optical touch screen device of claim 3, wherein the light emitter comprises an infrared light emitting diode.

5. The optical touch screen device of claim 3, wherein the light guiding member comprises a light guide portion and a reflective layer, the reflective layer covering the entire outer surface of the light guide portion except the light output portion and the light incident surface.

6. The optical touch screen device of claim 3, wherein the display screen is rectangular, the light guiding member arranged along an edge of the display screen, the plurality of elongated reflective plates comprising three elongated reflective plates, the three elongated reflective plates arranged along the other three edges of the display screen for reflecting the light from the light output portion to the display screen, the light output portion arranged facing the opposite one of the three elongated reflective plates.

7. The optical touch screen device of claim 1, wherein the single image capture device is arranged at a corner of the display screen between two adjacent edges of the display screen.

* * * * *